US 9,195,643 B2

(12) United States Patent
    Branton

(10) Patent No.: US 9,195,643 B2
(45) Date of Patent: Nov. 24, 2015

(54) DATA DRIVEN HIERARCHICAL PAGES

(71) Applicant: AppSense, Limited, Warrington (GB)

(72) Inventor: Paul Keith Branton, Rochdale (GB)

(73) Assignee: APPSENSE LIMITED, Warrington (GB)

( * ) Notice: Subject to any disclaimer, the term of this patent is extended or adjusted under 35 U.S.C. 154(b) by 356 days.

(21) Appl. No.: 13/904,443

(22) Filed: May 29, 2013

(65) Prior Publication Data

US 2014/0188958 A1    Jul. 3, 2014

Related U.S. Application Data

(63) Continuation-in-part of application No. 13/731,444, filed on Dec. 31, 2012.

(51) Int. Cl.
    G06F 7/00      (2006.01)
    G06F 17/27     (2006.01)
    G06F 17/30     (2006.01)
    G06F 17/22     (2006.01)

(52) U.S. Cl.
    CPC ........ *G06F 17/2735* (2013.01); *G06F 17/2241* (2013.01); *G06F 17/30569* (2013.01)

(58) Field of Classification Search
    CPC ............................................... G06F 17/30569
    See application file for complete search history.

(56) References Cited

U.S. PATENT DOCUMENTS

2007/0079236 A1    4/2007   Schrier et al.
2010/0115394 A1    5/2010   Oshima et al.
2012/0254201 A1   10/2012   Cochrane et al.

OTHER PUBLICATIONS

"InAppSettingsKit", http://www.inappsettingskit.com, printed on Jun. 11, 2013, 4 pages.

*Primary Examiner* — Ajith Jacob
(74) *Attorney, Agent, or Firm* — Wilmer Cutler Pickering Hale and Dorr LLP

(57) ABSTRACT

A method of managing data includes generating a model file containing descriptions of the data, wherein the descriptions of the data in the model file are formatted as a collection of dictionaries, wherein the descriptions of the data are divided into multiple groups that are associated with multiple hierarchical pages, and wherein the multiple groups associated with the multiple hierarchical pages are listed in the model file in a flat structure, and generating a controller file that, when executed by a processor, causes the processor to interpret the model file and present the data in the multiple hierarchical pages to a user, wherein the controller file refers to one of the multiple groups in the model file, wherein the controller file is re-used to interpret the multiple groups in the descriptions of the data and present the data in the multiple hierarchical pages.

18 Claims, 8 Drawing Sheets

```
<Settings on mainPage>
    <Settings on subPage1>
        <Settings on subSubPage1-1>
        </Settings>
        <Settings on subSubPage1-2>
        </Settings>
    </Settings>
    <Settings on subPage2>
        <Settings on subSubPage2-1>
        </Settings>
        <Settings on subSubPage2-2>
        </Settings>
    </Settings>
</Settings>
```

FIG. 3A

```
<Settings on mainPage>
</Settings>
<Settings on subPage1>
</Settings>
<Settings on subPage2>
</Settings>
<Settings on subSubPage1-1>
</Settings>
<Settings on subSubPage1-2>
</Settings>
<Settings on subSubPage2-1>
</Settings>
<Settings on subSubPage2-2>
</Settings>
```

FIG. 3B

DATA DRIVEN HIERARCHICAL PAGES

RELATED APPLICATION

This application claims priority to and is a continuation-in-part of U.S. patent application Ser. No. 13/731,444 filed on Dec. 31, 2012, which is incorporated by reference herein in its entirety.

BACKGROUND

Many computer systems and applications have user interfaces. Common user interfaces include configuration screens/pages via which a system or application user can view and/or modify the settings for the system or application. In general, a system or application developer needs to create layouts of the configuration screens/pages and to arrange controls and information within these screens/pages. The system or application developer also typically needs to write the code to link the user interface (UI) controls (e.g., buttons, switches, and sliders, etc.) with the underlying settings, e.g., to handle the retrieval/display/update/storage of the settings. Each individual setting and its corresponding UI control is usually maintained individually. The addition, change, or deletion of a setting and/or its corresponding UI control normally requires creation of new source code or modification of existing source code. This approach can be labor-intensive, time-consuming, and inefficient.

SUMMARY

In accordance with the disclosed subject matter, systems and methods are described for providing data driven hierarchical pages.

Disclosed subject matter includes, in one aspect, a method of managing data, which includes generating a model file on a non-transitory computer readable medium containing descriptions of the data, wherein the descriptions of the data in the model file are formatted as a collection of dictionaries, wherein the descriptions of the data are divided into multiple groups that are associated with multiple hierarchical pages, and wherein the multiple groups associated with the multiple hierarchical pages are listed in the model file in a flat structure, and generating a controller file on the non-transitory computer readable medium that, when executed by a processor, causes the processor to interpret the model file and present the data in the multiple hierarchical pages to a user, wherein the controller file refers to one of the multiple groups in the model file, wherein the controller file is re-used to interpret the multiple groups in the descriptions of the data and present the data in the multiple hierarchical pages.

In some embodiments, the controller file refers to the one of the multiple groups in the model file by a key.

In some other embodiments, the controller file, when executed by the processor, further causes the processor to handle loading of the data from a storage medium and storing of the data to the storage medium.

In some other embodiments, at least one dictionary in the collection of dictionaries contains a string and an array.

In some other embodiments, the multiple hierarchical pages have at least two levels.

Disclosed subject matter includes, in another aspect, a system for managing data, which includes a model file stored on a non-transitory computer readable medium containing descriptions of the data, wherein the descriptions of the data in the model file are formatted as a collection of dictionaries, wherein the descriptions of the data are divided into multiple groups that are associated with multiple hierarchical pages, and wherein the multiple groups associated with the multiple hierarchical pages are listed in the model file in a flat structure, and a controller file stored on the non-transitory computer readable medium that, when executed by a processor, causes the processor to interpret the model file and present the data in the multiple hierarchical pages to a user, wherein the controller file refers to one of the multiple groups in the model file, wherein the controller file is re-used to interpret the multiple groups in the descriptions of the data and present the data in the multiple hierarchical pages.

In some embodiments, the controller file refers to the one of the multiple groups in the model file by a key.

In some other embodiments, when executed by the processor, further handles loading of the data from a storage medium and storing of the data to the storage medium.

In some other embodiments, the multiple hierarchical pages have at least two levels.

In some other embodiments, at least one dictionary in the collection of dictionaries contains a string and an array.

Disclosed subject matter includes, in yet another aspect, a model file stored on a non-transitory computer readable medium for managing data, which includes descriptions of the data formatted as a collection of dictionaries, wherein the descriptions of the data are divided into multiple groups that are associated with multiple hierarchical pages in at least two levels, wherein the multiple groups associated with the multiple hierarchical pages are listed in a flat structure, and wherein, when interpreted by a controller at runtime, the model file causes the controller to: present the data in the multiple hierarchical pages to a user, and interpret the multiple groups in the descriptions of the data for the multiple hierarchical pages in the at least two levels.

In some embodiments, the controller refers to one of the multiple groups in the model file.

In some other embodiments, at least one dictionary in the collection of dictionaries contains a string and an array.

Disclosed subject matter includes, in yet another aspect, a non-transitory computer readable medium having executable instructions that, when executed by a processor, cause the processor to: load a model file containing descriptions of data, wherein the descriptions of the data in the model file are formatted as a collection of dictionaries, wherein the descriptions of the data are divided into multiple groups that are associated with multiple hierarchical pages, and wherein the multiple groups associated with the multiple hierarchical pages are listed in the model file in a flat structure, and interpret the model file and present the data in the multiple hierarchical pages to a user, wherein the executable instructions refer to one of the multiple groups in the model file, and wherein the executable instructions are re-used to interpret the multiple groups in the model file and present the data in the multiple hierarchical pages.

In some embodiments, the executable instructions refer to the one of the multiple groups in the model file by a key.

In some other embodiments, the executable instructions, when executed by the processor, further cause the processor to store at least a portion of the data in a storage medium.

In some other embodiments, the multiple hierarchical pages have at least two levels.

In some other embodiments, at least one dictionary in the collection of dictionaries contains a string and an array.

Disclosed subject matter includes, in yet another aspect, a method of managing data, which includes generating a model file on a non-transitory computer readable medium containing descriptions of the data, wherein the descriptions of the data in the model file are formatted as a collection of dictionaries, wherein the descriptions of the data are divided into multiple groups that are associated with multiple hierarchical pages, wherein the multiple groups associated with the multiple hierarchical pages are listed in the model file in a flat structure, and wherein a first entry in a first of the multiple hierarchical pages shares an identifier with a second entry in a second of the multiple hierarchical pages, and generating a controller file on the non-transitory computer readable medium that, when executed by a processor, causes the processor to interpret the model file and present the data in the multiple hierarchical pages to a user, wherein the controller file refers to one of the multiple groups in the model file, wherein the controller file is re-used to interpret the multiple groups in the descriptions of the data and present the data in the multiple hierarchical pages, and wherein the controller file is configured to retrieve data associated with the second entry and display at least a portion of the data associated with the second entry on the first of the multiple hierarchical pages.

Disclosed subject matter includes, in yet another aspect, a system for managing data, which includes a model file stored on a non-transitory computer readable medium containing descriptions of the data, wherein the descriptions of the data in the model file are formatted as a collection of dictionaries, wherein the descriptions of the data are divided into multiple groups that are associated with multiple hierarchical pages, wherein the multiple groups associated with the multiple hierarchical pages are listed in the model file in a flat structure, and wherein a first entry in a first of the multiple hierarchical pages shares an identifier with a second entry in a second of the multiple hierarchical pages, and a controller file stored on the non-transitory computer readable medium that, when executed by a processor, causes the processor to interpret the model file and present the data in the multiple hierarchical pages to a user, wherein the controller file refers to one of the multiple groups in the model file, wherein the controller file is re-used to interpret the multiple groups in the descriptions of the data and present the data in the multiple hierarchical pages, and wherein the controller file is configured to retrieve data associated with the second entry and display at least a portion of the data associated with the second entry on the first of the multiple hierarchical pages.

Disclosed subject matter includes, in yet another aspect, a model file stored on a non-transitory computer readable medium for managing data, which includes descriptions of the data formatted as a collection of dictionaries, wherein the descriptions of the data are divided into multiple groups that are associated with multiple hierarchical pages in at least two levels, wherein the multiple groups associated with the multiple hierarchical pages are listed in a flat structure, wherein a first entry in a first of the multiple hierarchical pages shares an identifier with a second entry in a second of the multiple hierarchical pages, and wherein, when interpreted by a controller at runtime, the model file causes the controller to: present the data in the multiple hierarchical pages to a user, interpret the multiple groups in the descriptions of the data for the multiple hierarchical pages in the at least two levels, and retrieve data associated with the second entry and display at least a portion of the data associated with the second entry on the first of the multiple hierarchical pages.

Disclosed subject matter includes, in yet another aspect, a model file stored on a non-transitory computer readable medium having executable instructions that, when executed by a processor, cause the processor to: load a model file containing descriptions of data, wherein the descriptions of the data in the model file are formatted as a collection of dictionaries, wherein the descriptions of the data are divided into multiple groups that are associated with multiple hierarchical pages, wherein the multiple groups associated with the multiple hierarchical pages are listed in the model file in a flat structure, and wherein a first entry in a first of the multiple hierarchical pages shares an identifier with a second entry in a second of the multiple hierarchical pages, and interpret the model file and present the data in the multiple hierarchical pages to a user, wherein the executable instructions refer to one of the multiple groups in the model file, wherein the executable instructions are re-used to interpret the multiple groups in the model file and present the data in the multiple hierarchical pages, and wherein the executable instructions are re-used to retrieve data associated with the second entry and display at least a portion of the data associated with the second entry on the first of the multiple hierarchical pages.

Various embodiments of the subject matter disclosed herein can provide one or more of the following capabilities. Systems and methods described herein can help reduce software development and maintenance time/cost, improve efficiency, enhance code re-usability, and improve consistency within an application/system or across multiple applications/systems.

These and other capabilities of embodiments of the invention will be more fully understood after a review of the following figures, detailed description, and claims.

BRIEF DESCRIPTION OF THE DRAWINGS

FIG. 3A illustrates arrangement of settings in a hierarchical fashion in a model file according to some embodiments of the disclosed subject matter.

FIG. 3B illustrates arrangement of settings in a flat structure in a model file according to some embodiments of the disclosed subject matter.

DETAILED DESCRIPTION

Figure 1:
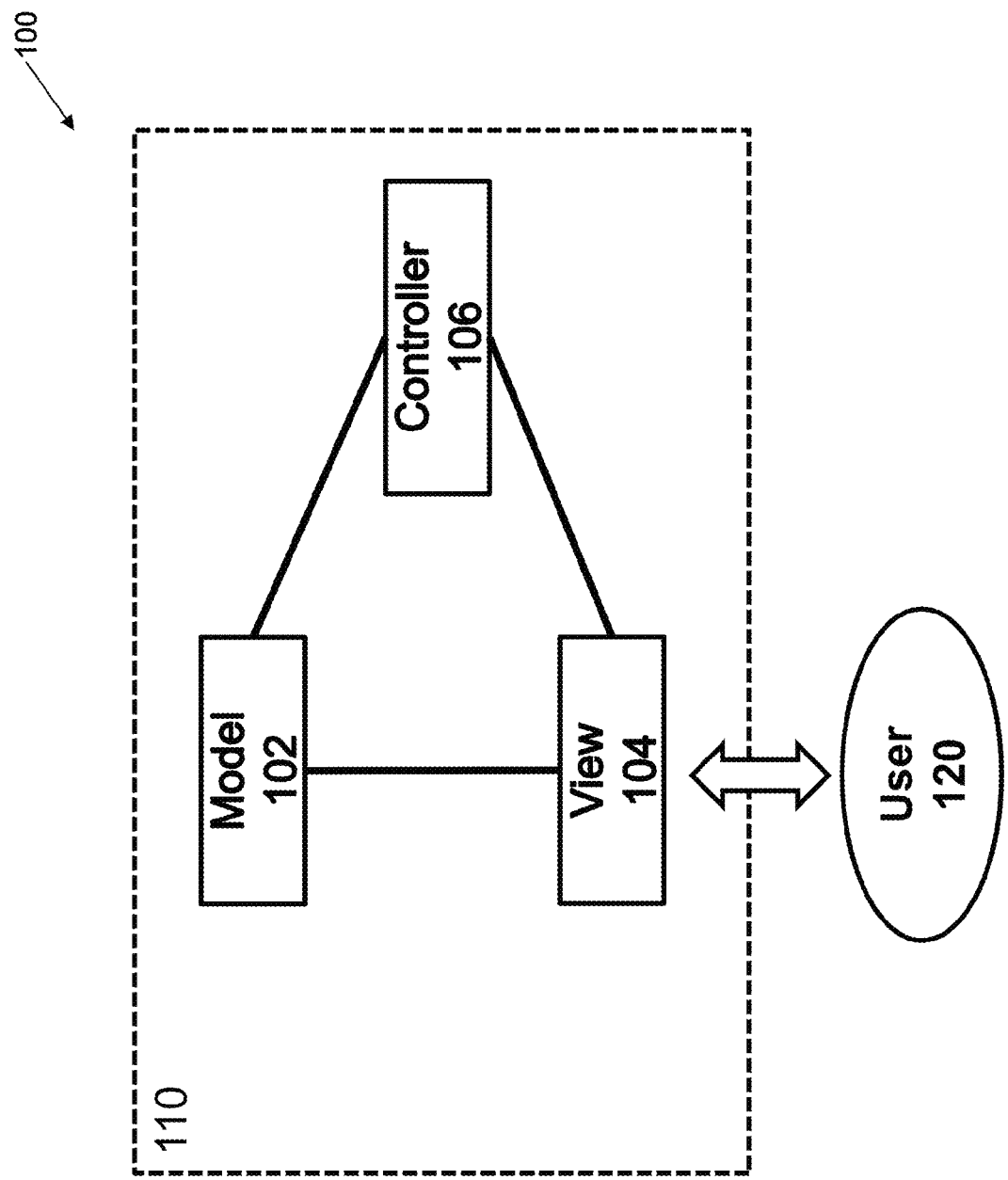
FIG. 1 illustrates an exemplary Model-View-Controller environment according to some embodiments of the disclosed subject matter.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the subject matter of the disclosed subject matter. In addition, it will be understood that the embodiments described below are only examples, and that it is contemplated that there are other systems and methods that are within the scope of the disclosed subject matter.

Various embodiments of the subject matter disclosed herein can provide more efficient and robust mechanisms for managing data. The techniques described herein can help reduce software development and maintenance time/cost, improve efficiency, enhance code re-usability, and improve consistency within an application/system or across multiple applications/systems.

A typical computer system or application generally has data associated with it. A common type of data is settings for the system or application. For example, a media player application can have a setting specifying the location (e.g., "D:\Documents\Music\") where the media player should look for media files, and an alarm clock application can have a setting defining the default snooze length (e.g., 5 minutes). The application developer normally needs to write software code to handle the retrieval, display, updating, and/or storage of the setting.

In one exemplary embodiment, an application developer can separate application settings themselves from the presentation of the settings on a user interface. For example, the developer can separate what the application settings are (e.g., data defining that the snooze length is 5 minutes), from how they are shown to the users of the application (e.g., a slider control showing the user that the snooze length is 5 minutes). The application developer can create a model file containing descriptions of the application settings (e.g., what they are) and leave the retrieval, display, updating, and/or storage of the application settings to a separate module (e.g., a controller). A controller can (at runtime) load the model file, interpret the descriptions of the application settings in the model file, and present the settings to the users of the application. When a change is needed (e.g., a new setting is needed, an existing setting is no longer needed, or an existing setting is modified), the developer can simply update the model file itself. There is no need to rewrite or modify the code for the controller. The existing controller can load and interpret the updated model file and present the updated settings to the users. In some situations, a single controller can be re-used to interpret and present a large number of settings, which can be grouped into multiple screens/pages in a hierarchy. A single controller sometimes can also be re-used across multiple applications. The re-use of controllers can help maintain consistency in look-and-feel across multiple settings, pages/screens, or applications/systems.

For instance, in the example of a media player application mentioned above, the developer can create a model file containing the descriptions of data settings (e.g., "SearchFolder" for the location where the media player should search for media files) and create a separate controller file to handle the retrieval, display, updating, and storage of the data settings. When an additional data setting (e.g., "DefaultVolume") is needed, the developer can simply update the model file to add the description for the new setting; there is no need to modify the controller. If the media player application has a large number of data settings, these data settings can be grouped into multiple hierarchical pages. For example, the configuration screen can start at a "General" setting page where one or more links can be embedded. The user can click on one of the links to go down to the next level of setting screens, which can also have one or more links to allow navigation further along the hierarchical chain. The single controller can be re-used to load and interpret the large number of data settings grouped into multiple hierarchical pages contained in the model file. There is no need to create a new controller or modify the existing controller.

According to some embodiments of the disclosed subject matter, a Model-View-Controller (MVC) architecture is an architecture that separates the information itself from the presentation of the information and the user interaction with the presentation. FIG. 1 presents a diagram illustrating an exemplary Model-View-Controller environment 100. A MVC architecture 110 can contain a model 102, a view 104, and a controller 106. The model 102 can consist of the system/application data itself (e.g., settings). The view 104 can represent the presentation of the data (e.g., a checkbox on a setting screen/page). The controller 106 can manage the relationship between the model 102 and the view 104 (e.g., translating a checkbox toggling action on the user interface into an event to update the corresponding setting). In an exemplary operation, the model 102 can update the view 104 (e.g., via the controller 106) so that the view 104 can present the data in the model 102 to a user 120. The user 120 can interact with the MVC architecture 110 (e.g., via the view 104). The controller 106 can manipulate the associated model 102 according to the user's action. In one example, the controller 106 can send commands to the model 102 to update the model's state (e.g., editing a document); in another example, the controller 106 can also send commands to its associated view 104 to change the view's presentation of the model 102 (e.g., by scrolling through a document).

A MVC architecture like the one illustrated in FIG. 1 can help allow separation of concerns (SoC) and improve code reusability. In computer science, SoC generally refers to a design principle separating a computer program into distinct features that overlap in functionality as little as possible. A concern can be any piece of interest or focus in a program. Multiple views can be associated with a model. For example, a set of data can be presented in the format of a table or in the format of a graph to users; an "on/off" setting can be represented as a checkbox or a button. The model for a setting can be re-used and thus there is no need to create duplicative model code for a second view. A model can notify its associated view(s) and controller(s) when there has been a change in its state. The notification can allow the views to produce an updated output, and the controllers to change the available set of commands. A view can also request from the model the information that it needs to generate an output representation.

According to some embodiments of the disclosed subject matter, the content of the data (e.g., application settings) can be maintained in a model (e.g., 102 in FIG. 1). The model can be stored and maintained in a separate model file, which can contain information for each datum piece (e.g., each application setting). At runtime, the controller (e.g., 106 in FIG. 1) can load and interpret the model file to present the data contained in the model in a desired view (e.g., 104 in FIG. 1). The controller can also handle loading data (e.g., application settings) from or storing data to a transitory or non-transitory storage.

Figure 2:
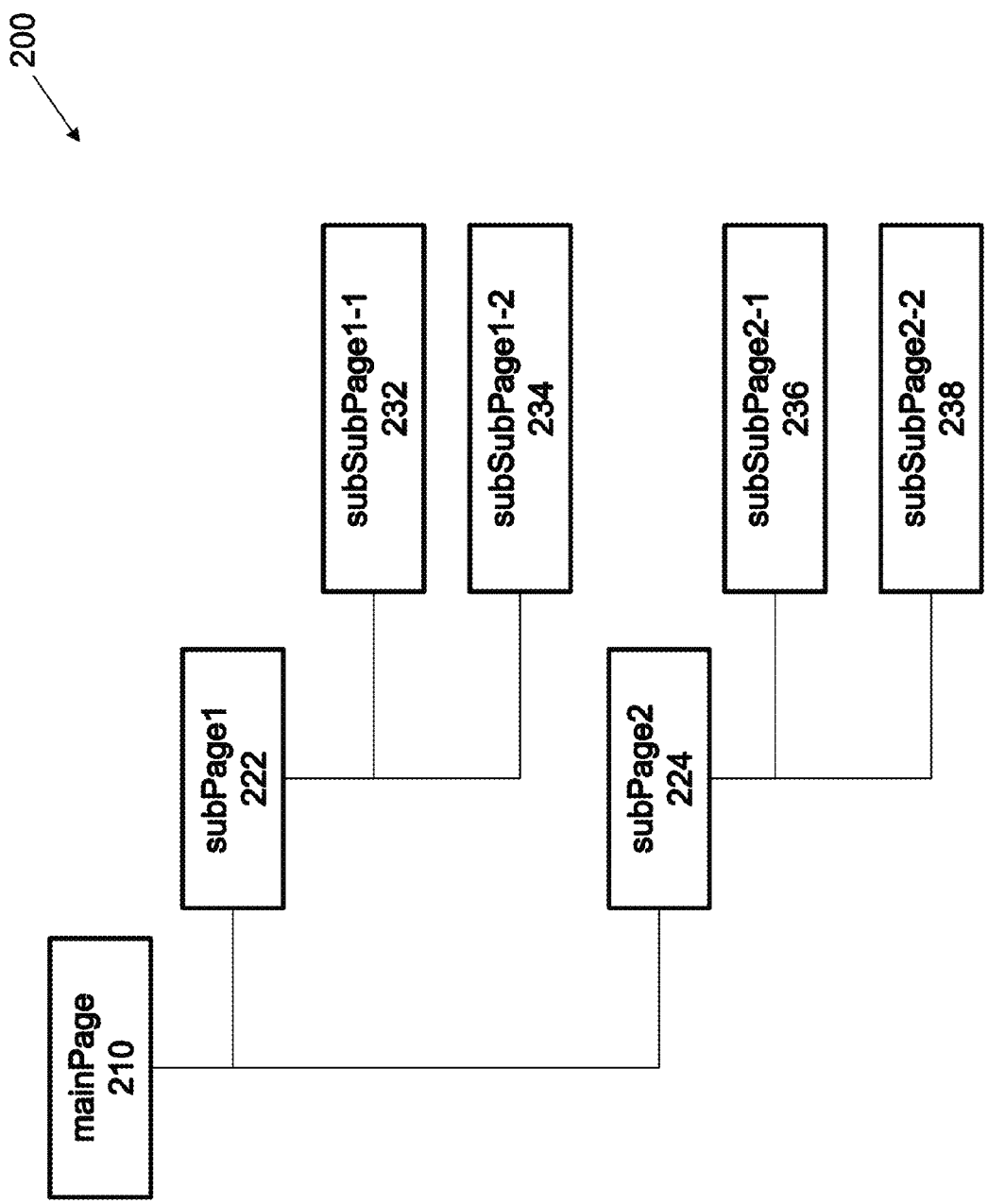
FIG. 2 illustrates an exemplary hierarchy of screens or pages according to some embodiments of the disclosed subject matter.

A model file can contain a large amount of data (e.g., a large number of application settings). Referring to FIG. 2, in some embodiments, the large number of settings can be grouped into multiple screens/pages in a hierarchical manner. The screen/page hierarchy can be visible when the settings are presented to users. For example, in an exemplary hierarchy of screens/pages 200, a user can start at the top/root of the hierarchy when he/she visits a mainPage 210, which can contain settings at the top level. From the mainPage 210, the user can navigate down one level along the hierarchical tree (e.g., by clicking a button or a link) to visit either subPage1

222 or subPage2 224, which can contain settings at the next level. From the subPage1 222, the user can further navigate down one level to visit settings contained in either subSubPage1-1 232 or subSubPage1-2 234. From the subPage2 224, the user can also further navigate down one level to visit settings contained in either subSubPage2-1 236 or subSubPage2-2 238.

Referring to FIG. 3A, in one embodiment, the screen/page hierarchy can be maintained within the model file. Settings in a model file can be organized in a hierarchy fashion consistent with the corresponding screen/page hierarchy. Settings for subPage1 and subPage2 can be embedded within the settings for mainPage. Settings for subSubPage1-1 and subSubPage1-2 can be embedded within the settings for subPage1. Settings for subSubPage2-1 and subSubPage2-2 can be embedded within the settings for subPage2.

Referring to FIG. 3B, in another embodiment, the settings can be stored and maintained in the model file without the screen/page hierarchy. For example, as shown in FIG. 3B, settings in a model file can be organized in a flat structure. The settings for subPage1, subPage2, subSubPage1-1, subSubPage1-2, subSubPage2-1, and subSubPage2-2 can be all at the same top/root level as the settings for mainPage. A flat structure in a model file can help ease maintenance burden and improve flexibility. Settings can also be arranged in any order. In one example, settings for subPage1 can be listed before settings for subPage2 or before settings for mainPage. In another example, the setting(s) for a particular page/subpage can be referenced from any other setting regardless their groupings with respect to the screen/page hierarchy. In addition, a page can be linked to from any other page regardless of their positions in the screen/page hierarchy. For example, subSubPage2-1 can be referenced from within subPage1; mainPage can be launched from a UI control on subSubPage1-2.

In some embodiments, a model file can be in the format of a collection of dictionaries. In computer science, a dictionary (also known as an associative array) can refer to an abstract data type composed of a collection of key-value pairs, wherein each possible key appears at most once in the collection. An exemplary model file is listed in Appendix A. As shown, the dictionaries can contain either strings or arrays. Arrays themselves can contain dictionaries. When the settings in a model file are maintained in a flat structure (e.g., as illustrated in FIG. 3B), the model file can include at the root/top level one dictionary with a key (e.g., "mainPage," "subPage1," etc.) for every setting page. Each key can correspond to a dictionary value for that page. The main page (e.g., mainPage) can be the entry point for the settings in the model file. The key for the main page can be set by default or be customized by the application developer. In some situations, the key for a particular page (e.g., the main page) can be configured so that it matches the entry point key specified in the corresponding controller file.

In some embodiments, a page dictionary can contain a title and a section array of dictionaries. Each section dictionary can contain a title and an array of items for the section. Each item in the item array can be a dictionary that can contain the keys and string values. The string values stored in the dictionaries can correspond to a set of fixed keys. Some examples of fixed keys and their corresponding string values are listed in Table 1 below:

| Key | Corresponding String Value |
| --- | --- |
| "title" | Can be the display title for a settings page, a section, or an individual setting. For example: "Settings," "Target, " "Test," "Unlink Account," or "There's More." |
| "key" | Can be the name of the underlying setting or action associated with the UI control. For example: "targetID," "username," "unlink," or "yesOrNo." Can also be the reference to another page to be launched. For example: "subPage1." |
| "type" | Can be one of "text"—a textbox, which can show the value of the setting referenced in the following "key" (e.g., "targetID"); "label"—a text field, which can show the value of the setting referenced in the following "key" (e.g., "username"); "disclosure"—a link to another page, which can be referenced in the following "key" (e.g. "subPage1"); "switch"—an On/Off switch, whose state can be associated with the setting referenced in the following "key" (e.g. "yesOrNo"); "button"—a push button, which can trigger the action referenced in the following "key" (e.g. "unlink"); or "check"—an item among multiple options, whose value can be stored in the following "key" (e.g. "100" or "200"). |
| "image" | (For a button) Can be a background image for a button. (for others) Can represent an optional image to the left of a title. |
| "url" | Can be a hyperlink to be opened (e.g., http:, mailto:, etc.). |

According to some embodiments of the disclosed subject matter, a controller can be written in source code from scratch or based on a standard code template. The source code of the controller can include the "wiring-up" of data (e.g., application settings) and their corresponding UI controls (e.g., buttons, textboxes, sliders, etc.) in the associated view. The controller can optionally control the layouts of the settings on the screens/pages and in some situations can dictate how the settings are presented in the view.

A controller can be written in various programming language (e.g., C/C++, Java, Objective C, etc.). The Objective C source code for an exemplary controller (e.g., "ASSettingsViewController.m") is presented in Appendix B. The controller can set a default starting point, which can match one of the page keys in the corresponding mode file. For example: in the "initWithCoder" function as shown at line 19 in Appendix B.

self.currentPage=@"mainPage"; //set default to mainPage
The controller can also set up the page by loading data from the model file (e.g., a preference list file or a plist file). For example: in the "setupPage" function as shown at lines 29-32 in Appendix B,

```
NSString *path = [[NSBundle mainBundle] pathForResource:@"Settings"
                    ofType:@"plist"];
NSMutableDictionary* root = [[NSMutableDictionary alloc]
                    initWithContentsOfFile:path];
```

At runtime, the model file can first be transformed into a binary format. The current page configured earlier can indicate which page to be selected first. Once the initial page is set, the title and the section array of dictionary can be loaded. For example, in the "setupPage" function as shown at lines 34-36 in Appendix B,

```
NSDictionary* currentPageDict = [root objectForKey:self.currentPage];
self.title = [currentPageDict objectForKey:@"title"];
self.sections = [currentPageDict objectForKey:@"sections"];
```

The controller can also support an optional "autofill" feature, e.g., as illustrated in the "setupPage" function as shown in Appendix B.

The controller can use an internal array to generate a dynamic list of key names and tag values, and then convert between key names and tag values when a user interacts with the controls in the user interface (e.g., clicks a button/switch). For example, in the "getTagForKey" and "getKeyForTag" functions as shown at lines 78-85 and 88-94 in Appendix B,

```
-(NSUInteger)getTagForKey:(NSString*)key{
    NSUInteger tag = [_keyTags indexOfObject:key];
    if (NSNotFound==tag) {
        [_keyTags addObject:key];
        tag = _keyTags.count - 1;
    }
    return tag;
}
-(NSString*)getKeyForTag:(NSUInteger)tag{
    NSString* key;
    if (tag < _keyTags.count) {
        key = [_keyTags objectAtIndex:tag];
    }
    return key;
}
```

In some embodiment, when a page refers to another page, a new view controller can be created by re-using the same controller code. For example, in the "table View" function as shown at lines 223-230 in Appendix B,

```
if ([type isEqualToString:@"disclosure"]) { // create a new view controller
                          and re-use our controller code
    ASSettingsViewController *viewController = [self.storyboard
         instantiateViewControllerWithIdentifier:@"settingsView"];
    [viewController setCurrentPage:[cellData objectForKey:
@"key"]]; // the new controller needs a reference
    [self.navigationController pushViewController:viewController
                                        animated:YES];
}
```

Figure 4B:
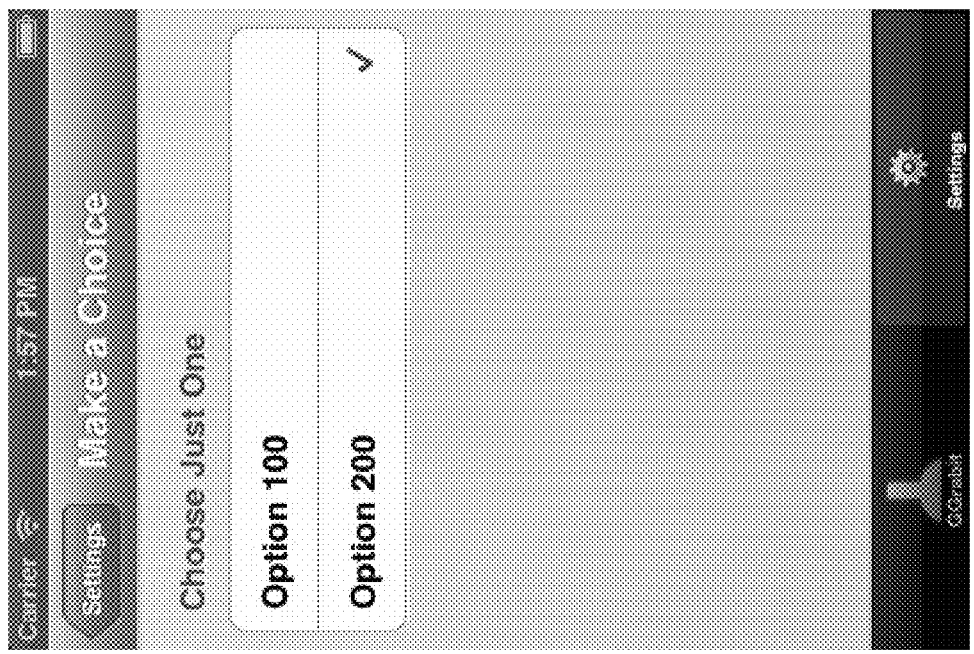
FIGS. 4A and 4B illustrate an exemplary user interface when a model is presented to users in a view, according to some embodiments of the disclosed subject matter.
Figure 4A:
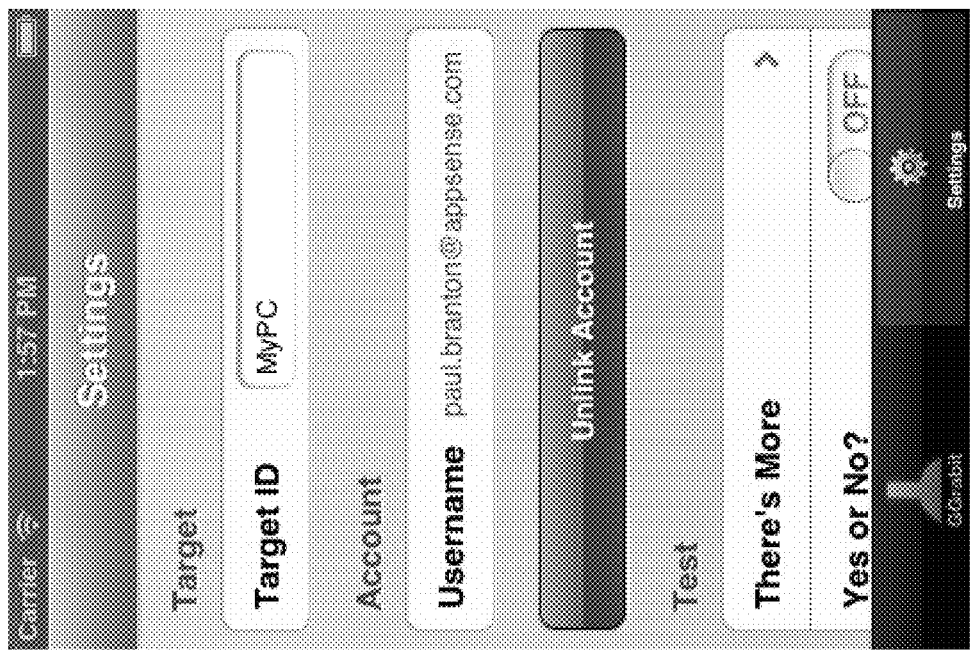
Figure 5:
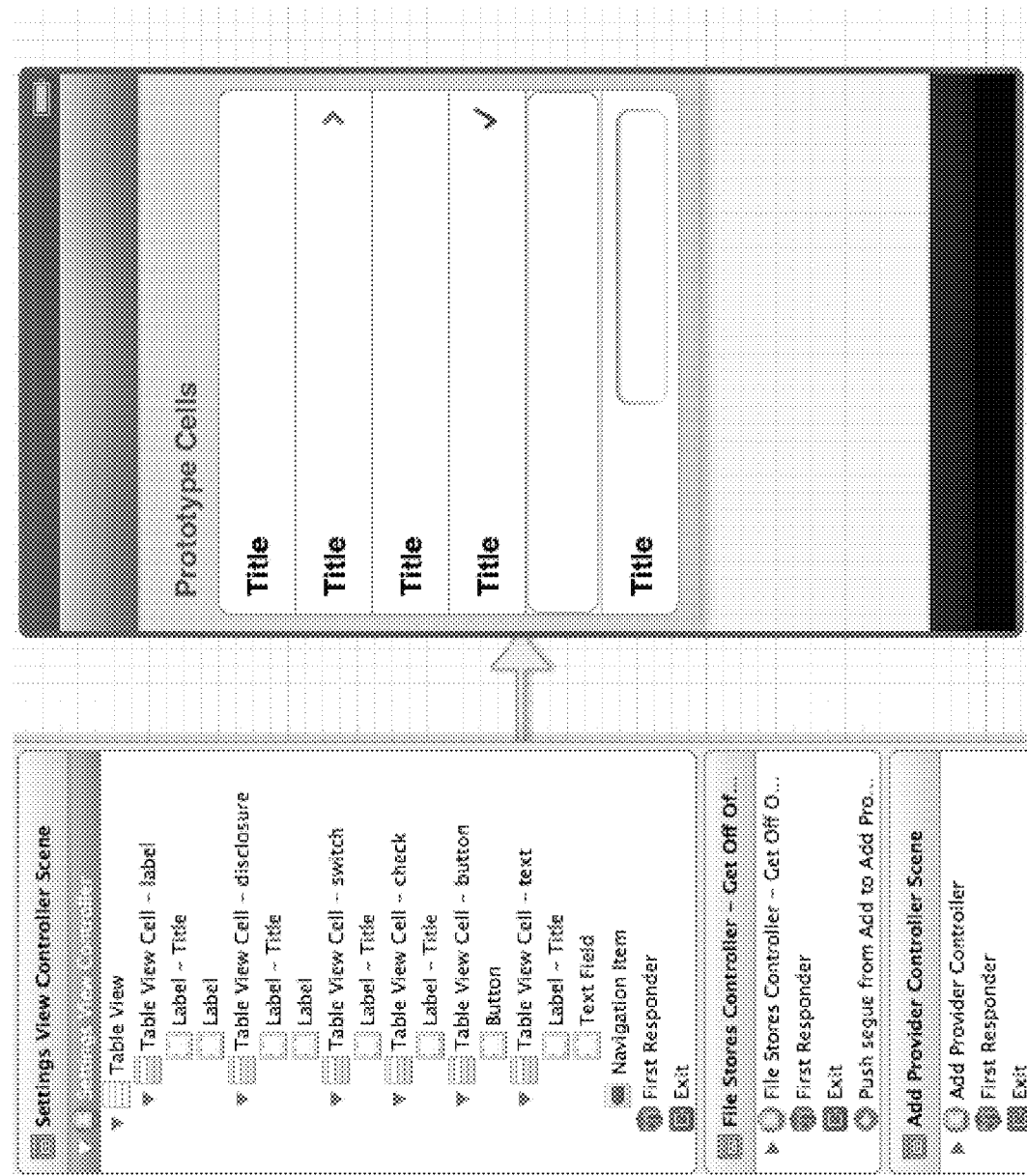
FIG. 5 illustrates a visual design tool according to some embodiments of the disclosed subject matter.

According to some embodiments of the disclosed subject matter, at runtime a controller can be executed to load a model file. The controller can interpret the model file and launch a corresponding view to present the data contained in the model file. FIGS. 4A-4B illustrate two pages/screens in an exemplary application user interface when the model file as illustrated in Appendix A is loaded and presented to the user. FIG. 4A illustrates an exemplary "mainPage" page, where the target ID can be set, the user name can be viewed, an unlink account action can be triggered, and a yes/no switch can be toggled. This figure represents a working example of how an embodiment of the disclosed subject matter can be used to present application settings in a typically iPhone user interface. A "subPage1" page can also be launched from the "mainPage" page when the "There's More" link is clicked. FIG. 4B illustrates an exemplary "subPage1" page, where two options (e.g., "Option 100" and "Option 200") are available for selection. An application developer can also configure the layout of pages/screens and/or the desired view via an exemplary visual design tool, as illustrated in FIG. 5. As shown in FIG. 5, each cell type can have a corresponding layout. FIG. 5 demonstrates layouts for label, disclosure, switch, check, button, and text, etc. There can be any number of elements in each cell. Additional layout types can be added and catered for in the controller code.

According to the embodiments described herein, a large number of data (e.g., a large number of application settings) can be maintained and managed. The large number of settings can be grouped into multiple pages/screens, which can be organized in a hierarchy. The large number of settings, when stored in a model file, can be kept in a flat structure, which can be easier to maintain. A corresponding controller can automatically load the data (e.g., application settings) contained in the model file and present the data to a user in a view via the application's user interface. When a piece of datum (e.g., an application setting) needs to be added/removed/modified, an application developer may only need to update the model file; the same corresponding controller can then interpret the updated model file and present the new data to the user in a view. There is no need to update the source code file for the corresponding controller. This can help reduce application development time/cost and improve efficiency.

According to the embodiments described herein, the corresponding controller can be re-used for the large number of settings. For example, a single controller can be used for a large number of settings and screens/pages, even if these settings are grouped for multiple pages/screens; a single controller can be used regardless of the number of levels in the screen/page hierarchy. For example, the screen/page hierarchy can have two levels, e.g., mainPage and (subPage1 and subPage2); the screen/page hierarchy can have three levels, e.g., mainPage, (subPage1 and subPage2), and (subSubPage1-1, subSubPage1-2, subSubPage2-1, and subSubPage2-2); and the screen/page hierarchy can also have more than three levels. In these situations, there is no need for an application developer to re-write or modify the source code for the controller when a setting page/screen is added or removed or when a level is added to or removed from the screen/page hierarchy. This can reduce application development time/cost and improve efficiency, and also enhance code re-usability.

In addition, as discussed earlier, embodiments of the disclosed subject matter can allow re-use of pages at different locations. A page can be linked to from any other page regardless of their positions in the screen/page hierarchy. For example, subPage2 can be referenced from within subPage1 or mainPage.

The embodiments described herein can allow separation of data and the presentation thereof. In the situation of presenting a hierarchy of pages of settings, the relationship among the settings and/or among the pages can be defined or driven by the data in the model file. The controller can remain unchanged, minimizing the cost of system/application development and maintenance. In addition, the re-use of controllers can help maintain consistent look-and-feel across multiple screens/pages, and in some situations across multiple applications or systems.

Figure 6:
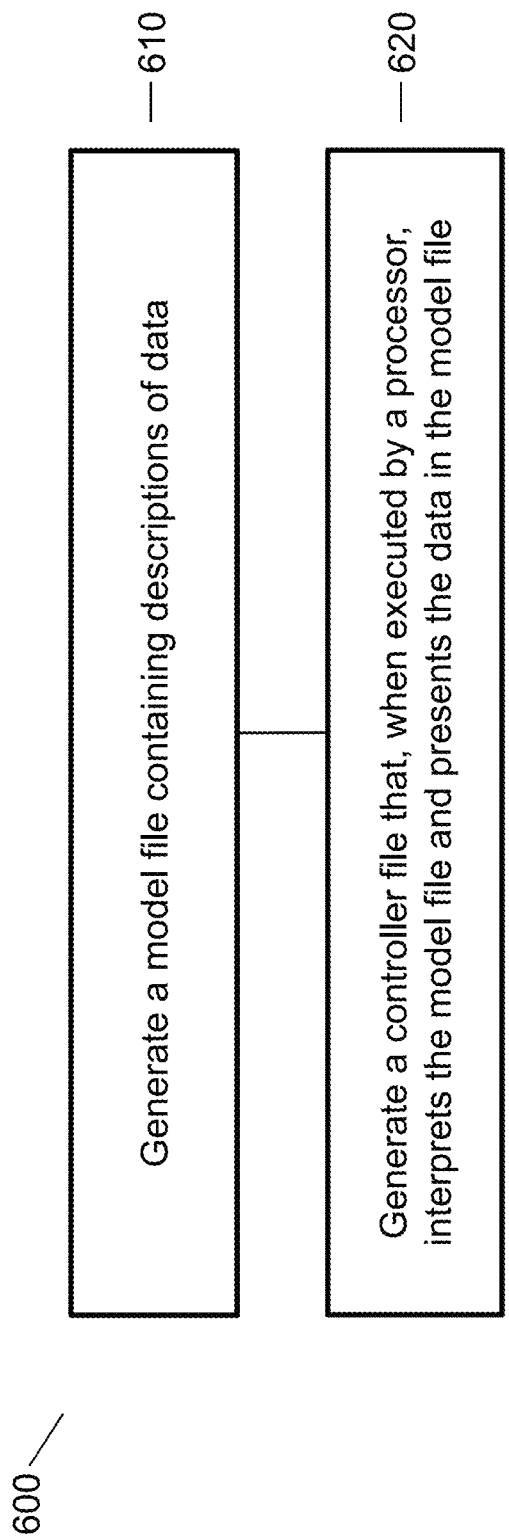
FIG. 6 illustrates an exemplary method of managing data according to some embodiments of the disclosed subject matter.

FIG. 6 illustrates an exemplary method of managing data according to some embodiments of the disclosed subject matter.

At stage 610, a model file can be generated which can contain descriptions of data. The data can be divided into multiple groups that are associated with multiple hierarchical pages. The data can include configuration settings of a computer application. The multiple hierarchical pages can have at least two levels. The descriptions of the data in the model file can be in a format of a collection of dictionaries. At least one dictionary in the collection of dictionaries can contain a string and an array. The multiple groups associated with the multiple hierarchical pages can be listed in the model file in a flat structure.

At stage 620, a controller file can be generated. The controller file, when executed by a processor, can interpret the model file and present the data in the multiple hierarchical pages to a user. The controller file can be re-used to interpret the descriptions of the data and present the data in the multiple hierarchical pages. The controller file, when executed by the processor, can also handle loading of the data from a storage medium and storing of the data to the storage medium. The controller file can include a reference to one of the multiple groups in the model file.

Additional features of embodiments of the disclosed subject matter can improve the display of settings on data driven hierarchical pages. In some embodiments, information (e.g., synopsis of data) from a subpage can be displayed on the main page or a parent page. For illustration purpose only, assuming there are two data driven hierarchical pages in a two-level hierarchy (i.e., a main page and a subpage): As discussed earlier in this document, a single controller can process the two hierarchical pages defined in a model file without needing to add a second controller or modify the first controller. Certain information that is normally accessible only on a subpage can be processed by the controller and displayed on the main page. In some embodiments, when the controller processes an entry (e.g., a link or a textbox) within the main page, the controller can search the entries within the subpage for an entry that shares an identifier (e.g., key) with the entry within the main page. If a shared identifier is found, information that is associated with the subpage entry and is normally accessible only from the subpage can be loaded and displayed on the main page; if a shared identifier is not found, no information that is normally accessible only from the subpage will be displayed on the main page. In this way, how information is presented can be configured through the model file itself; there is no need to create a new controller or update an existing controller.

Figure 7A:
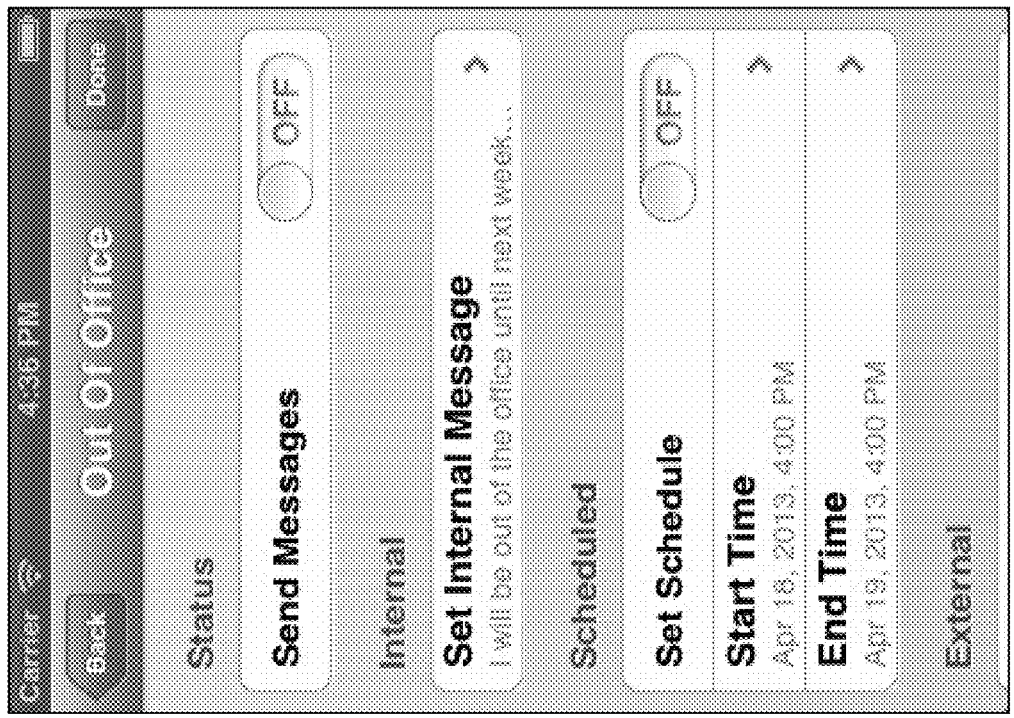
FIGS. 7A and 7B illustrate another exemplary user interface when a model is presented to users in a view, according to some embodiments of the disclosed subject matter.
Figure 7B:
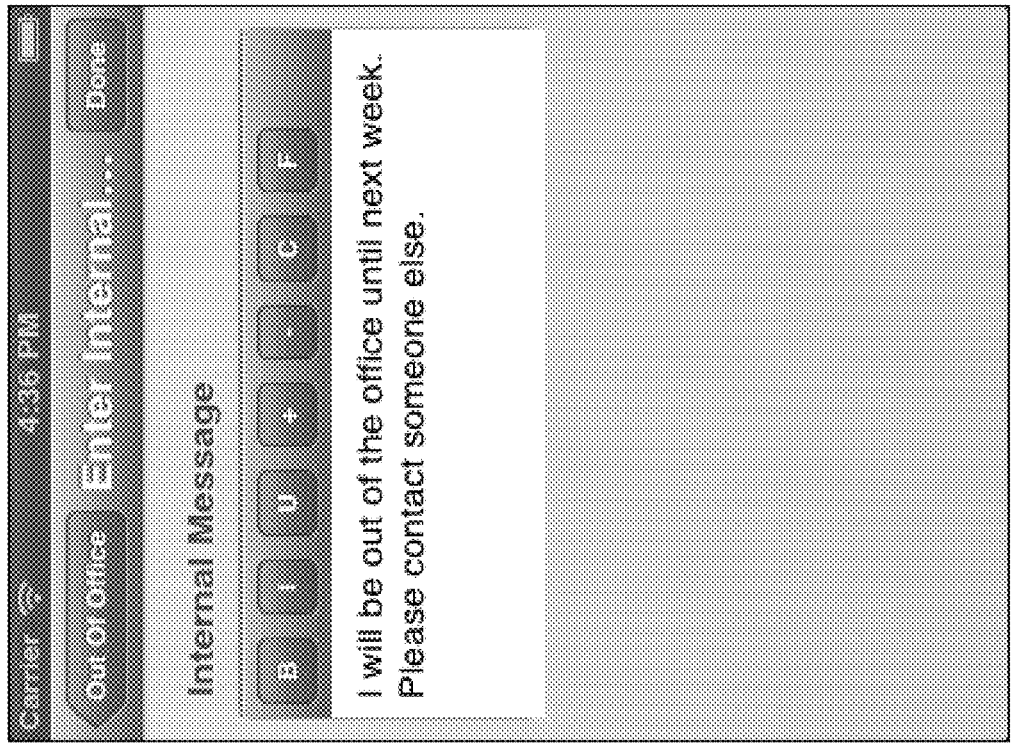

FIGS. 7A-7B illustrate two pages/screens in another exemplary application user interface when the model file as illustrated in Appendix C is loaded and presented to the user. FIG. 7A illustrates an exemplary main page, which contains a "Set Internal Message" link. Clicking this link would launch a subpage (as illustrated in FIG. 7B) where a user can edit the internal message (e.g., "I will be out of office until next week. Please contact someone else."). As illustrated in FIG. 7A, the internal message or a portion thereof (e.g., "I will be out of the office until next week . . . ") can be displayed on the main page under the "Set Internal Message" link; in addition, the current settings for the start and end times (e.g., "Apr. 18, 2012, 4:00 PM" and "Apr. 19, 2013, 4:00 PM" respectively) can also be displayed on the main page next to the "Start Time" and "End Time" links. This additional feature can allow a user to "preview" at least a portion of the data, which is otherwise available only when the subpage is visited.

This "preview" feature can be achieved using a model file similar to the ones discussed above. In some embodiments, a model file can be configured to conform to a naming convention for keys and subpage names. For example, at lines 31-38 of the exemplary model file in Appendix C, the "Out of Office" main page contains the following section:

```
<dict>
    <key>title</key>
    <string>Set Internal Message</string>
    <key>type</key>
    <string>disclosure</string>
    <key>key</key>
    <string>internalMessage</string>
</dict>
``` where the title is set to "Set Internal Message" and the type is set to "disclosure," indicating that a subpage would be loaded and opened when the "Set Internal Message" element is selected (e.g., clicked by a user). Note that the key of this "Set Internal Message" element on the main page is set to "internalMessage." At lines 158-163 of the exemplary model file in Appendix C, the "Enter Internal Message" subpage contains the following section:

```
<dict>
    <key>type</key>
    <string>richtextView</string>
    <key>key</key>
    <string>internalMessage</string>
</dict>
``` where the type is set to "richtextView" and the key is set to "internalMessage." The "richtextView" type can instruct a controller how to retrieve the associated data and convert its format suitable for displaying. The "internalMessage" key can instruct the controller where to fetch and store its data. Note that in this example illustrated in Appendix C an element in the subpage shares the same key as an element in the main page, namely "internalMessage."

A controller according to embodiments of the disclosed subject matter can be updated to support this "preview" feature. For example, as illustrated in FIGS. 7A and 7B, at runtime a controller can search elements of the subpages for the shared key (e.g., "internalMessage"), load the subpage data associated with the key (e.g., "I will be out of office until next week . . . "), and display the subpage data along with the element on the main page associated with the shared key (e.g., next to the "Set Internal Message" link).

A section of the Objective C source code for an updated exemplary controller is presented in Appendix D. The controller can search the dictionary in the model file for an entry which has a matching key and does not have a type of "disclosure." Avoiding entries with a type of "disclosure" can help skip the entries in the main/parent page which does not contain the subpage data to be "previewed." For example: in the "textForKey" function as shown at lines 8-28 in Appendix D:

```
// search the dictionary for the type
NSString* type = nil;  // start off as not found
for (NSDictionary* sections in root.allValues) { // search sections
    for (NSDictionary* items in [sections objectForKey:@"sections"]) { //
and items within sections
        // Create a predicate that finds matching key values that don't have
the type 'disclosure'
        NSPredicate* predicate = [NSPredicate predicateWithFormat:
@"(key ==%@) AND type != 'disclosure'", key];
        NSDictionary* item = [[[items objectForKey:@"items"]
filteredArrayUsingPredicate:predicate] lastObject];
        if ([item objectForKey:@"type"]) {
            type = [NSString stringWithString:[item objectForKey:@"type"]];
            break; // once we have found one we can stop
        }
    }
    if (type) {
        break; // break out of outer loop
    }
}
```

Once a matching entry (e.g., sharing the same key but not a type of "disclosure") is identified, the associated data is retrieved. If the associated data is in a custom format, it can be converted into human readable text. In one example, if the type is a rich text view, the stored data can be retrieved and the associated text data can be extracted. For example, in the "textForKey" function as shown at lines 33-44 in Appendix D:

```
if ([type isEqualToString:kASTypeRichTextView]) {
    // To get innerText from HTML just find stuff outside of the <>
    NSArray *components = [value
componentsSeparatedByCharactersInSet: [NSCharacterSet
characterSetWithCharactersInString:@"<>"]];
    NSMutableArray *componentsToKeep = [NSMutableArray array];
    for (int i = 0; i < [components count]; i = i + 2) {
        [componentsToKeep addObject:[components objectAtIndex:i]];
    }
    text = [componentsToKeep componentsJoinedByString:@""];
}
```

In another example, if the type is a date picker, the date can be retrieved and then converted into a text format. For example, in the "textForKey" function as shown at lines 45-51 in Appendix D:

```
        else if ([type isEqualToString:kASTypeDatePicker]){
            // Date Picker stores dates in RFC3399 style
            NSDate* date = [NSDate dateFromRFC3399:value];
            // Convert to pretty style suitable for the locale
            text =[NSDateFormatter localizedStringFromDate:date
        dateStyle:NSDateFormatterMediumStyle
        timeStyle:NSDateFormatterShortStyle];
        }
```

Many computing devices, especially mobile devices, can have limited display area (e.g., screen size). In one aspect, this "preview" feature as described above can help improve the utilization of limited display area. In another aspect, the "preview" display can be driven by the model files. According to embodiments of the disclosed subject matter, there is no need to update the source code file for the corresponding controller to turn on or off the "preview" feature. This can further help reduce application development time/cost and improve efficiency.

Figure 8:
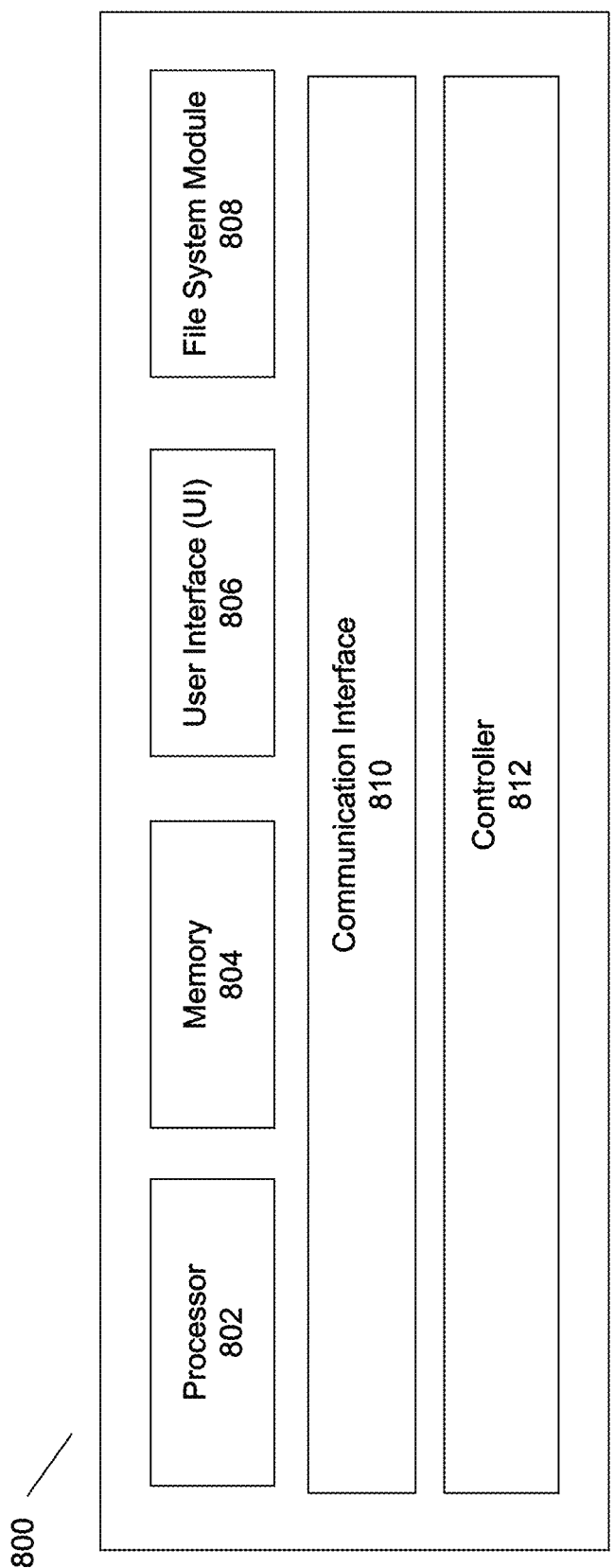
FIG. 8 illustrates a block diagram of an exemplary computing device according to some embodiments of the disclosed subject matter.

FIG. 8 illustrates a block diagram of a computing device that can be used to implement one or more aspects of the functionality described herein. The computing device 800 can include at least one processor 802 and at least one memory 804. The processor 802 can be hardware that is configured to execute computer readable instructions such as software. The processor 802 can be a general processor or be an application specific hardware (e.g., an application specific integrated circuit (ASIC), programmable logic array (PLA), field programmable gate array (FPGA), or any other integrated circuit). The processor 802 can execute computer instructions or computer code to perform desired tasks. The memory 804 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The computing device 800 can also optionally include a user interface (UI) 806, a file system module 808, and a communication interface 810. The UI 806 can provide an interface for users to interact with the computing device 800 in order to access one or more aspects of the functionality described herein. The file system module 808 can be configured to maintain a list of all data files, including both local data files and remote data files, in every folder in a file system. The file system module 808 can be further configured to coordinate with the memory 804 to store and cache files/data. The communication interface 810 can allow the computing device 800 to communicate with external resources (e.g., a network or a remote client/server). The computing device 800 can also include a controller 812. The description of the controller 812 and its functionalities can be found in the discussion above. The controller 812 can be a separate module or can reside in the memory 804. The memory 804 can also contain one or more model files in one or more forms (e.g., source code format, and/or binary/executable format) as described above. The computer device 800 can include additional modules, fewer modules, or any other suitable combination of modules that perform any suitable operation or combination of operations.

In some embodiments, the disclosed subject matter can be implemented in many computing platforms, such as smartphones, tablets, Windows PC, and Mac OS systems, etc.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions.

What is claimed is:

1. A method of managing data, comprising:
generating a model file on a non-transitory computer readable medium containing descriptions of the data, wherein the descriptions of the data in the model file are formatted as a collection of dictionaries, wherein the descriptions of the data are divided into multiple groups that are associated with multiple hierarchical pages, wherein the multiple groups associated with the multiple hierarchical pages are listed in the model file in a flat structure, and wherein a first entry in a first of the multiple hierarchical pages shares an identifier with a second entry in a second of the multiple hierarchical pages; and
generating a controller file on the non-transitory computer readable medium that, when executed by a processor, causes the processor to interpret the model file and present the data in the multiple hierarchical pages to a user, wherein the controller file refers to one of the multiple groups in the model file,
wherein the controller file is re-used to interpret the multiple groups in the descriptions of the data and present the data in the multiple hierarchical pages, and
wherein the controller file is configured to retrieve data associated with the second entry and display at least a portion of the data associated with the second entry on the first of the multiple hierarchical pages.

2. The method of claim 1, wherein the controller file refers to the one of the multiple groups in the model file by a key.

3. The method of claim 1, wherein the controller file, when executed by the processor, further causes the processor to handle loading of the data from a storage medium and storing of the data to the storage medium.

4. The method of claim 1, wherein at least one dictionary in the collection of dictionaries contains a string and an array.

5. The method of claim 1, wherein the multiple hierarchical pages have at least two levels.

6. A system for managing data, comprising:
a model file stored on a non-transitory computer readable medium containing descriptions of the data, wherein the descriptions of the data in the model file are formatted as a collection of dictionaries, wherein the descriptions of the data are divided into multiple groups that are associated with multiple hierarchical pages, wherein the multiple groups associated with the multiple hierarchical pages are listed in the model file in a flat structure, and wherein a first entry in a first of the multiple hierarchical pages shares an identifier with a second entry in a second of the multiple hierarchical pages; and
a controller file stored on the non-transitory computer readable medium that, when executed by a processor, causes the processor to interpret the model file and present the data in the multiple hierarchical pages to a user, wherein the controller file refers to one of the multiple groups in the model file,
wherein the controller file is re-used to interpret the multiple groups in the descriptions of the data and present the data in the multiple hierarchical pages, and
wherein the controller file is configured to retrieve data associated with the second entry and display at least a portion of the data associated with the second entry on the first of the multiple hierarchical pages.

7. The system of claim 6, wherein the controller file refers to the one of the multiple groups in the model file by a key.

8. The system of claim 6, wherein the controller file, when executed by the processor, further handles loading of the data from a storage medium and storing of the data to the storage medium.

9. The system of claim 6, wherein the multiple hierarchical pages have at least two levels.

10. The system of claim 6, wherein at least one dictionary in the collection of dictionaries contains a string and an array.

11. A model file stored on a non-transitory computer readable medium for managing data, the model file comprising:
descriptions of the data formatted as a collection of dictionaries,
wherein the descriptions of the data are divided into multiple groups that are associated with multiple hierarchical pages in at least two levels,
wherein the multiple groups associated with the multiple hierarchical pages are listed in a flat structure,
wherein a first entry in a first of the multiple hierarchical pages shares an identifier with a second entry in a second of the multiple hierarchical pages, and
wherein, when interpreted by a controller at runtime, the model file causes the controller to:
present the data in the multiple hierarchical pages to a user,
interpret the multiple groups in the descriptions of the data for the multiple hierarchical pages in the at least two levels, and
retrieve data associated with the second entry and display at least a portion of the data associated with the second entry on the first of the multiple hierarchical pages.

12. The model file of claim 11, wherein the controller refers to one of the multiple groups in the model file.

13. The method of claim 11, wherein at least one dictionary in the collection of dictionaries contains a string and an array.

14. A non-transitory computer readable medium having executable instructions that, when executed by a processor, cause the processor to:
load a model file containing descriptions of data, wherein the descriptions of the data in the model file are formatted as a collection of dictionaries, wherein the descriptions of the data are divided into multiple groups that are associated with multiple hierarchical pages, wherein the multiple groups associated with the multiple hierarchical pages are listed in the model file in a flat structure, and wherein a first entry in a first of the multiple hierarchical pages shares an identifier with a second entry in a second of the multiple hierarchical pages; and
interpret the model file and present the data in the multiple hierarchical pages to a user,
wherein the executable instructions refer to one of the multiple groups in the model file,
wherein the executable instructions are re-used to interpret the multiple groups in the model file and present the data in the multiple hierarchical pages, and
wherein the executable instructions are re-used to retrieve data associated with the second entry and display at least a portion of the data associated with the second entry on the first of the multiple hierarchical pages.

15. The non-transitory computer readable medium of claim 14, wherein the executable instructions refer to the one of the multiple groups in the model file by a key.

16. The non-transitory computer readable medium of claim 14, wherein the executable instructions, when executed by the processor, further cause the processor to store at least a portion of the data in a storage medium.

17. The non-transitory computer readable medium of claim 14, wherein the multiple hierarchical pages have at least two levels.

18. The non-transitory computer readable medium of claim 14, wherein at least one dictionary in the collection of dictionaries contains a string and an array.

* * * * *